United States Patent
Bhide et al.

(10) Patent No.: US 10,540,405 B2
(45) Date of Patent: *Jan. 21, 2020

(54) MANAGEMENT OF PARALLEL USER INPUTS IN ELECTRONIC COMMUNICATIONS

(71) Applicant: International Business Machines Corporation, Armonk, NY (US)

(72) Inventors: Manish A. Bhide, Hyderabad (IN); Krishna K. Bonagiri, Hyderabad (IN); Nagaraju Narla, Karimnagar (IN); Rajesh K. Pandey, Secunderabad (IN)

(73) Assignee: International Business Machines Corporation, Armonk, NY (US)

( * ) Notice: Subject to any disclaimer, the term of this patent is extended or adjusted under 35 U.S.C. 154(b) by 1100 days.

This patent is subject to a terminal disclaimer.

(21) Appl. No.: 14/271,495

(22) Filed: May 7, 2014

(65) Prior Publication Data
US 2015/0324424 A1    Nov. 12, 2015

(51) Int. Cl.
*G06F 16/951*    (2019.01)
*G06F 16/245*    (2019.01)
*H04L 12/58*    (2006.01)

(52) U.S. Cl.
CPC .......... *G06F 16/951* (2019.01); *G06F 16/245* (2019.01); *H04L 51/28* (2013.01); *H04L 51/16* (2013.01)

(58) Field of Classification Search
CPC ......... G06F 17/30864; G06F 17/30867; G06F 17/30286; G06F 17/30595; G06F 16/951; G06F 16/245; G06Q 30/02; H04L 51/22; H04L 51/28; H04L 51/16
USPC ................................................. 707/769, 726
See application file for complete search history.

(56) References Cited

U.S. PATENT DOCUMENTS

| | | | | |
|---|---|---|---|---|
| 7,222,156 | B2 * | 5/2007 | Gupta | G06F 17/241 709/206 |
| 7,328,242 | B1 * | 2/2008 | McCarthy | G06Q 10/10 709/203 |
| 8,056,010 | B2 | 11/2011 | Kieselbach et al. | |
| 8,095,604 | B2 * | 1/2012 | Essenmacher | G06Q 10/107 709/206 |

(Continued)

FOREIGN PATENT DOCUMENTS

| | | |
|---|---|---|
| EP | 2410477 B1 | 3/2013 |
| WO | 2007033464 A1 | 3/2007 |
| WO | 2011144384 A1 | 11/2011 |

OTHER PUBLICATIONS

U.S. Appl. No. 14/606,077, entitled "Management of Parallel User Inputs in Electronic Communications", filed Jan. 27, 2015.

(Continued)

*Primary Examiner* — Michael Pham
(74) *Attorney, Agent, or Firm* — Stephen R. Yoder

(57) ABSTRACT

A discussion thread is associated with a master recipients list that is maintained at an author's computer or a server computer. The recipients list is revised as participants in the discussion are added to and/or removed from the discussion. An author is notified when target recipients do not match the master recipients list. When a participant is added to the discussion from an old discussion instance, a thread manager provides for the added participant to receive a more current discussion instance.

12 Claims, 6 Drawing Sheets

(56) References Cited

U.S. PATENT DOCUMENTS

| | | | | |
|---|---|---|---|---|
| 2003/0163537 A1* | 8/2003 | Rohall | | G06Q 10/107 709/206 |
| 2006/0075040 A1* | 4/2006 | Chmaytelli | | G06Q 10/107 709/206 |
| 2007/0073871 A1* | 3/2007 | Adams | | G06Q 10/107 709/224 |
| 2007/0143428 A1* | 6/2007 | Kumar | | G06Q 10/107 709/206 |
| 2008/0098072 A1* | 4/2008 | Jones | | G06Q 10/109 709/206 |
| 2009/0063636 A1* | 3/2009 | Heidloff | | G06Q 10/107 709/206 |
| 2010/0088377 A1* | 4/2010 | Johnson | | G06Q 10/107 709/206 |
| 2010/0293475 A1 | 11/2010 | Nottingham et al. | | |
| 2011/0126126 A1 | 5/2011 | Blair | | |
| 2012/0110092 A1 | 5/2012 | Keohane et al. | | |
| 2013/0262590 A1 | 10/2013 | Patil et al. | | |
| 2013/0290435 A1* | 10/2013 | Martin | | H04L 51/28 709/206 |
| 2014/0096033 A1* | 4/2014 | Blair | | G06F 3/01 715/752 |
| 2014/0379815 A1* | 12/2014 | Cudak | | H04L 51/16 709/206 |
| 2015/0215241 A1* | 7/2015 | Zhou | | H04L 51/16 709/206 |

OTHER PUBLICATIONS

Appendix P, List of IBM Patents or Patent Applications Treated as Related.

Chang et al., "Adding Additional Recipients to Existing Ennails", IP.com Prior Art Database Technical Disclosure, IPCOM000217058D, Apr. 30, 2012, pp. 1-4, Copyright 2012 Symantec Corporation.

"System for notifying teammate when concurrently composing reply to the same thread", Authors Disclosed Anonymously, IP.com Prior Art Database Technical Disclosure, IPCOM000225238D, Feb. 1, 2013, pp. 1-4.

Filed Jan. 27, 2015, U.S. Appl. No. 14/606,077.

* cited by examiner

MANAGEMENT OF PARALLEL USER INPUTS IN ELECTRONIC COMMUNICATIONS

FIELD OF THE INVENTION

The present invention relates generally to the field of electronic communications, and more particularly to managing communications updates.

BACKGROUND OF THE INVENTION

Conversation threading is a feature used by many email clients, bulletin boards, newsgroups, and/or internet forums where software aids the user by visually grouping messages. Messages are usually grouped in a hierarchy by topic, with any replies to a message arranged visually near to the original message. A set of messages grouped in this way is called a topic thread or simply a thread. A discussion forum, e-mail client, and/or news client is said to have "threaded topics" or a "threaded mode" if messages can be grouped in this manner.

In a hierarchically threaded system, as responses are made to specific posts, they may also be made to specific users, or a set of users. Threaded conversations therefore tend to focus the originator on the specific views and the personality of the posting user. This occurs less in forums where the latest message is just added to the end of the list.

It is known to identify groups of email threads, for example commercially available, web-based email applications group email by distinctive threads.

SUMMARY

Embodiments of the present invention disclose a method, computer program product, and system for tracking discussion instances within a discussion thread. A first computer system determines a participant list for a discussion thread. The first computer system monitors participation in a discussion thread based on the participant list. The first computer system, responsive to a discussion instance related to the discussion thread and associated with a set of participants that doesn't match the participant list, notifies a user of a mismatch between the set of participants and the participant list.

DETAILED DESCRIPTION

Figure 1:
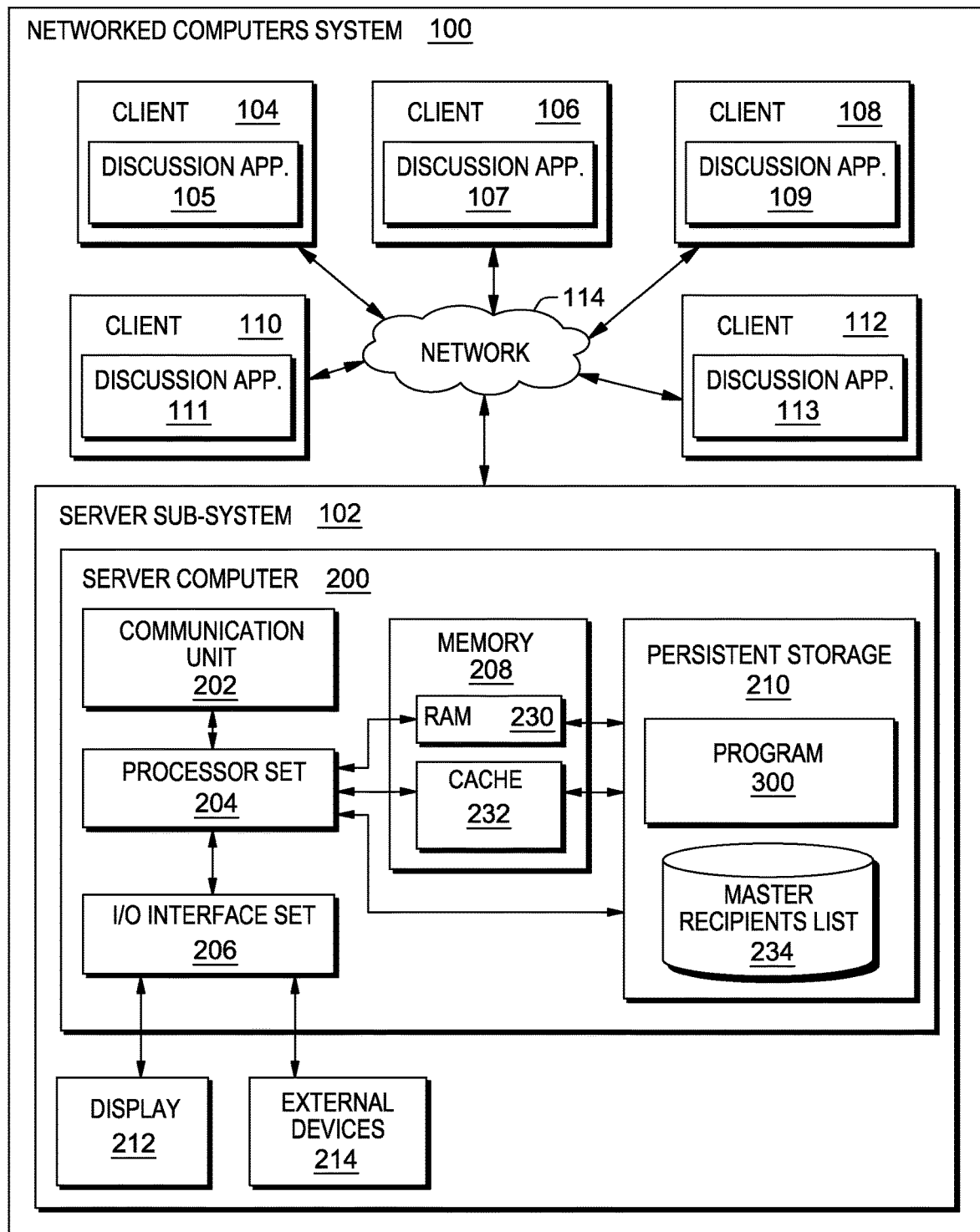
FIG. 1 is a schematic view of a first embodiment of a system according to the present invention.

A discussion thread is associated with a master recipients list that is maintained at an author's computer or a server computer. The recipients list is revised as participants in the discussion are added to and/or removed from the discussion. An author is notified when target recipients do not match the master recipients list. When a participant is added to the discussion from an old discussion instance, a thread manager provides for the added participant to receive a more current discussion instance. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to the Figures. FIG. 1 is a functional block diagram illustrating various portions of networked computers system 100, in accordance with one embodiment of the present invention, including: server sub-system 102; client sub-systems 104, 106, 108, 110, 112; discussion applications 105, 107, 109, 111, 113; communication network 114; server computer 200; communication unit 202; processor set 204; input/output (I/O) interface set 206; memory device 208; persistent storage device 210; display device 212; external device set 214; random access memory (RAM) devices 230; cache memory device 232; thread manager program 300; and master recipients list 234.

Server sub-system 102 is, in many respects, representative of the various computer sub-system(s) in the present invention. Accordingly, several portions of server sub-system 102 will now be discussed in the following paragraphs.

Server sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Thread manager program 300 is a collection of machine readable instructions and/or data that is used to create, manage and control certain software functions that will be discussed in detail below, in the Example Embodiment sub-section of this Detailed Description section.

Server sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Server sub-system 102 is shown as a block diagram with many double arrows. These double arrows (no separate reference numerals) represent a communications fabric, which provides communications between various components of server sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer readable storage media. In general, memory 208 can include any suitable volatile or non-volatile computer readable storage media. It is further noted that, now and/or in the near future: (i) external device(s) 214 may be able to supply, some or all, memory for server sub-system 102; and/or (ii) devices external to server sub-system 102 may be able to provide memory for server sub-system 102.

Thread manager program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Thread manager program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer readable storage medium that is also part of persistent storage 210.

Communication unit 202, in these examples, provides for communications with other data processing systems or devices external to server sub-system 102. In these examples, communication unit 202 includes one or more network interface cards. Communication unit 202 may provide communications through the use of either or both physical and wireless communications links. Any software modules discussed herein may be downloaded to a persistent storage device (such as persistent storage device 210) through a communications unit (such as communication unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer readable storage media such as, for example, thumb drives, portable optical or magnetic disks, and memory cards. Software and data used to practice embodiments of the present invention, for example, thread manager program 300, can be stored on such portable computer readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the present invention. However, it should be appreciated that any particular program nomenclature herein is used merely for convenience, and thus the present invention should not be limited to use solely in any specific application identified and/or implied by such nomenclature.

Thread manager program 300 operates to maintain the master recipients list, or participant list. When a new participant is added to the master recipients list, thread manager program 300 operates to provide the new participant with access to any missing discussion instances in the discussion thread.

Some embodiments of the present invention recognize the following facts, potential problems and/or potential areas for improvement with respect to the current state of the art: (i) electronic communications typically involve some form of a recipient list; (ii) some participants in the communications may add/delete one or more participants to the communication group when, for example, a participant replies to an earlier communication; (iii) parallel and/or subsequent replies to an earlier electronic communication thread may fail to recognize a change in participation; (iv) not only additions of new participants are made, but current participants may also be removed from the communications for a particular purpose, especially when some participants are circulating confidential information; (v) new participants added to an existing communications thread may not have access to some of the previous communications exchanged in the thread; and (vi) in an enterprise, large numbers of emails are sent that include multiple recipients.

Use cases illustrating the function of various embodiments of the present invention follow. For example, Able sends an email to Baker, Charlie, David, and Elizabeth. Baker replies to all participants from Able's email with a comment. Charlie replies to all participants from Baker's reply. David realizes that Francis should also participate in the email-based discussion. Accordingly, David replies to all participants from Charlie's reply and adds Francis as a recipient. Elizabeth replies to all from Charlie's reply. Finally, Baker, Charlie, and Able each submit replies to all participants from Elizabeth's email. An email-based discussion continues from various versions of the email thread. In this example, a problem arises because Francis is not copied in Charlie's reply so Francis does not receive all the replies in the email conversation. This scenario plays out frequently in today's enterprises.

For another example, Able sends an email to Baker, Charlie, David, and Elizabeth. Everyone except Baker is a manager for the same enterprise. Baker replies to all from Able's email. Charlie replies and adds content to the email that should be shared only with managers. Accordingly, Charlie removes Baker from the recipient list and replies to the designated recipients from the email sent by Able. David replies to all from Baker's email before David notices Charlie's reply from Able's email. Elizabeth reads all of the emails in the thread and then replies to all from David's email. The discussion continues among managers regarding the manager-confidential topic. In this example, a problem arises because Baker is copied on the reply sent by Elizabeth that contains confidential information of which Baker should not be aware. This example presents the need of a mechanism to add/remove recipients from an email conversation.

For yet another example, Able sends an email to Baker, Charlie, and David. Baker replies to all from Able's email. Charlie replies to all to Able's email. David replies to all from Able's email. David also adds new recipients Elizabeth and Francis. In this example, a problem arises because the new recipients Elizabeth and Francis will not receive the emails from Baker and Charlie. This example presents the need for a mechanism to send the email communications from Baker and Charlie to Elizabeth and Francis.

Figure 2:
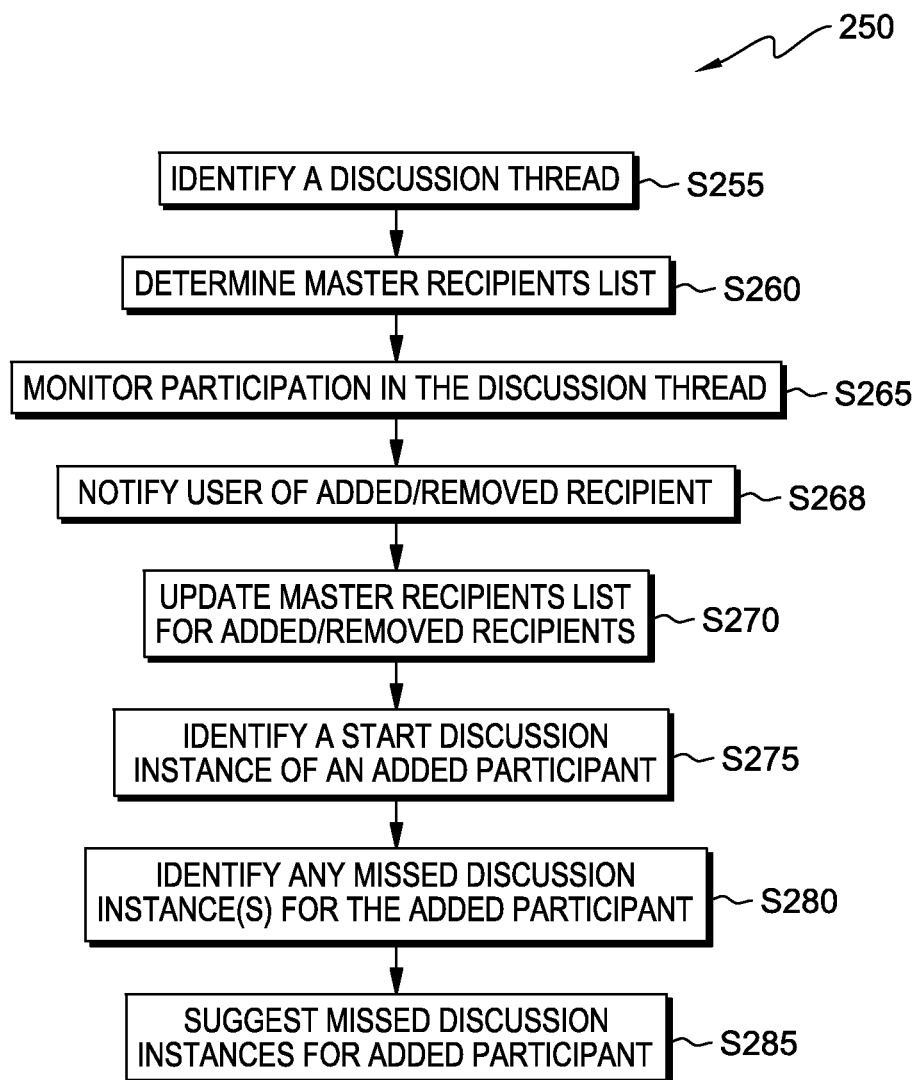
FIG. 2 is a flowchart showing a method performed, at least in part, by the first embodiment system.
Figure 3:
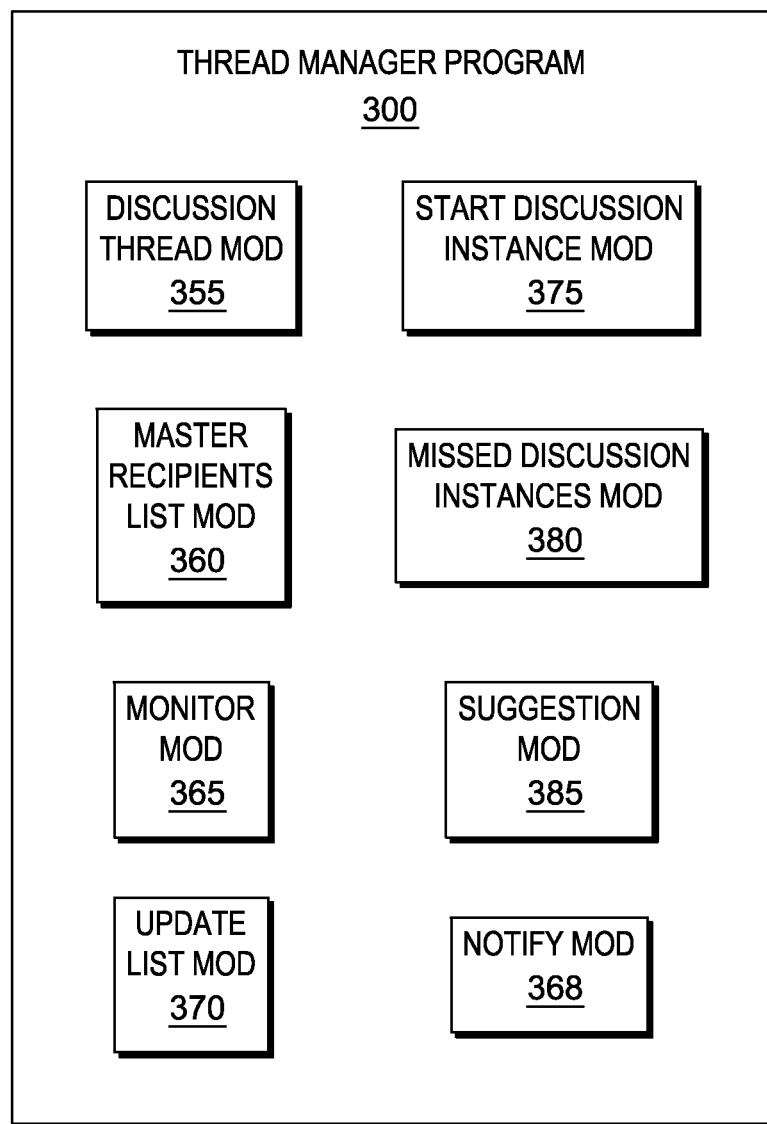
FIG. 3 is a schematic view of a machine logic (for example, software) portion of the first embodiment system.

FIG. 2 shows flowchart 250 depicting a first method according to the present invention. FIG. 3 shows tread manager program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins at step S255, where discussion thread module 355 identifies a discussion thread. A discussion thread is a set of related individual comments, or messages, from various participants of a discussion, whether recorded electronically in the form of digital transcripts, or directly input as electronic communications by the participants. Each individual comment is referred to herein as a discussion instance. The individual comments are generated by a discussion application corresponding to a client sub-system, such as discussion application 105 corresponding to client sub-system 104. A discussion application may be one, or more of the following: (i) email application; (ii) online discussion forum; (iii) social media application; corporate instance messaging application; and/or (iv) call center application. In some embodiments, discussed in more detail below, an email application is used, such that the discussion thread is an email thread and the discussion instance is an individual email.

Processing proceeds to step S260, where master recipients list module 360 determines the recipients to be included in a master recipients list, also referred to as a participant list, for a discussion thread. In this embodiment, the master recipients list is determined by identifying the set of participants in the originating discussion instance because at the time a first unrelated discussion thread begins, the "new" discussion thread is identified in step S255. Alternatively, a participant selects an existing discussion thread for creating a master recipients list and the master recipients list module aggregates each participant identified in the existing discussion thread. Alternatively, the master recipients list is the set of participants in the latest discussion instance.

Processing proceeds to step S265, where monitor module 365 monitors participation in the discussion thread for new participants and removed participants. Generally, for each discussion instance, participants may be added and/or removed from the discussion. In some embodiments of the present invention, authority to add/remove participants is only with the "owner" of the discussion thread, whether the originator, or otherwise having authority as an owner. The monitor module compares a target recipients list with the master recipients list to identify any mismatch between the two lists. In this embodiment, the target recipients list is the set of identified, or planned, recipients prior to publication of the discussion instance. Alternatively, the target recipients list is the set of users who are provided access to the discussion instance.

Processing proceeds to step S268, where notify module 368 notifies a user of an added and/or removed recipient according to any participant mismatch determined by monitor module 365. A user may be the sender, owner, and/or a third party that may take an action regarding the target recipients list, such as modifying or cancelling publication of the discussion instance. In this embodiment, the notified user is provided a set of options including: (i) publish with existing target recipients list; (ii) publish with existing target recipients list and update the master recipients list according to the target recipients list (add/remove recipients); and/or (iii) cancel publication of the discussion instance. Alternatively, the notified user is provided the option to deny publication and cause the originator of the discussion instance to revise the target recipients list. Alternatively, the notified user is provided fewer of the options noted above and/or provided additional options associated with managing a discussion instance having added and/or removed recipients with respect to the master recipients list.

Processing proceeds to step S270, where update list module 370 updates the master recipients list for added and/or removed participants. Where a participant is removed intentionally, that is, when the removal of a participant is not by accident, or merely incidental for a particular discussion instance, the update list module updates the master recipients list generated in step S260. For added, or new, participants, update module 370 updates the master recipients list accordingly and further processes the new entry as described in the discussion that follows.

Processing proceeds to step S275, where start discussion instance module 375, identifies a start discussion instance for an added participant. The start discussion instance is the discussion instance where a new participant is added as a recipient. The start discussion instance may be the latest discussion instance, the original discussion instance, or any discussion instance in between the original and the latest.

Processing proceeds to step S280, where missed discussion instances module 380 identifies any missed discussion instances for the added participant. An added participant may not have access to, or may not have received, discussion instances dated earlier than the creation date of the participant's start discussion instance. Further, when a participant is added to a discussion thread and the corresponding master recipients list, it is likely that discussion instances are created in parallel with or after the creation date of the participant's start discussion instance. In various embodiments, a missed discussion instance is any discussion instance that is not communicated to the added participant including: (i) discussion instances occurring before the generation of the participant's start discussion instance (ii) discussion instances occurring before the added participant is added to the master recipients list; (iii) discussion instances occurring in parallel with the generation of the participant's start discussion instance; (iv) discussion instances occurring in parallel with the added participant being added to the master recipients list; (v) discussion instances occurring after the generation of the participant's start discussion instance; (vi) discussion instances occurring after the participant is added to the master recipients list. In this embodiment, a missed discussion instance is any discussion instance occurring in parallel with or after the date/time of the participant's start discussion thread, but not after the date/time that the participant is added to the master recipients list. The missed discussion module identifies those discussion instances that meet the criteria of a missed discussion instance.

Processing proceeds to step S285, where suggestion module 385 suggests missed discussion instances for the added participant. In this embodiment, the suggestion is directed to the author of the discussion instance where the new participant is added. In that way, the author is provided the opportunity to further inform the added participant with missed discussion instances. Accordingly, the suggestion module provides a record of each missed discussion instance for the author to select for transmission to the added participant. Alternatively, the suggestion is directed to the added participant, who is notified by the suggestion module of each missed discussion instance to select for receipt. Alternatively, each missed discussion instance is automatically provided to the added participant for review.

The form of the suggestion list and the form in which the added recipient receives the selected missed discussion instances will vary according to the discussion application. For example, an email application may be instructed by the suggestion module to forward the selection of missed emails to the added participant.

Figure 4A:
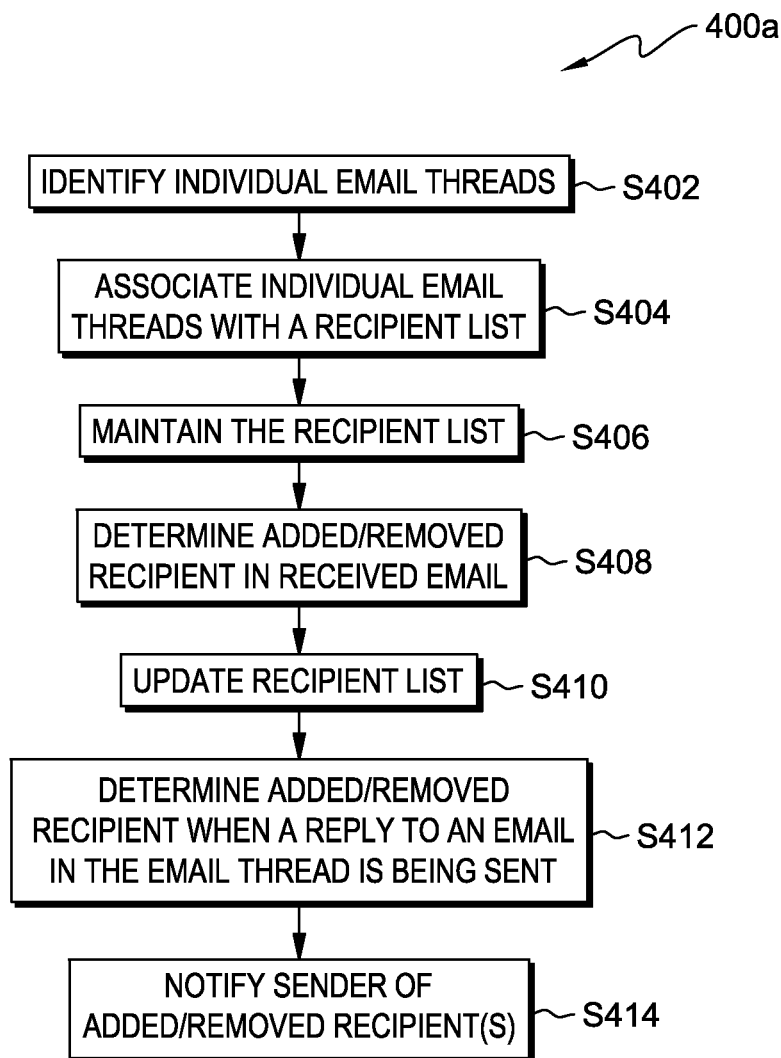
FIG. 4A is a flowchart showing a first method performed, at least in part, by a second embodiment system.
Figure 4B:
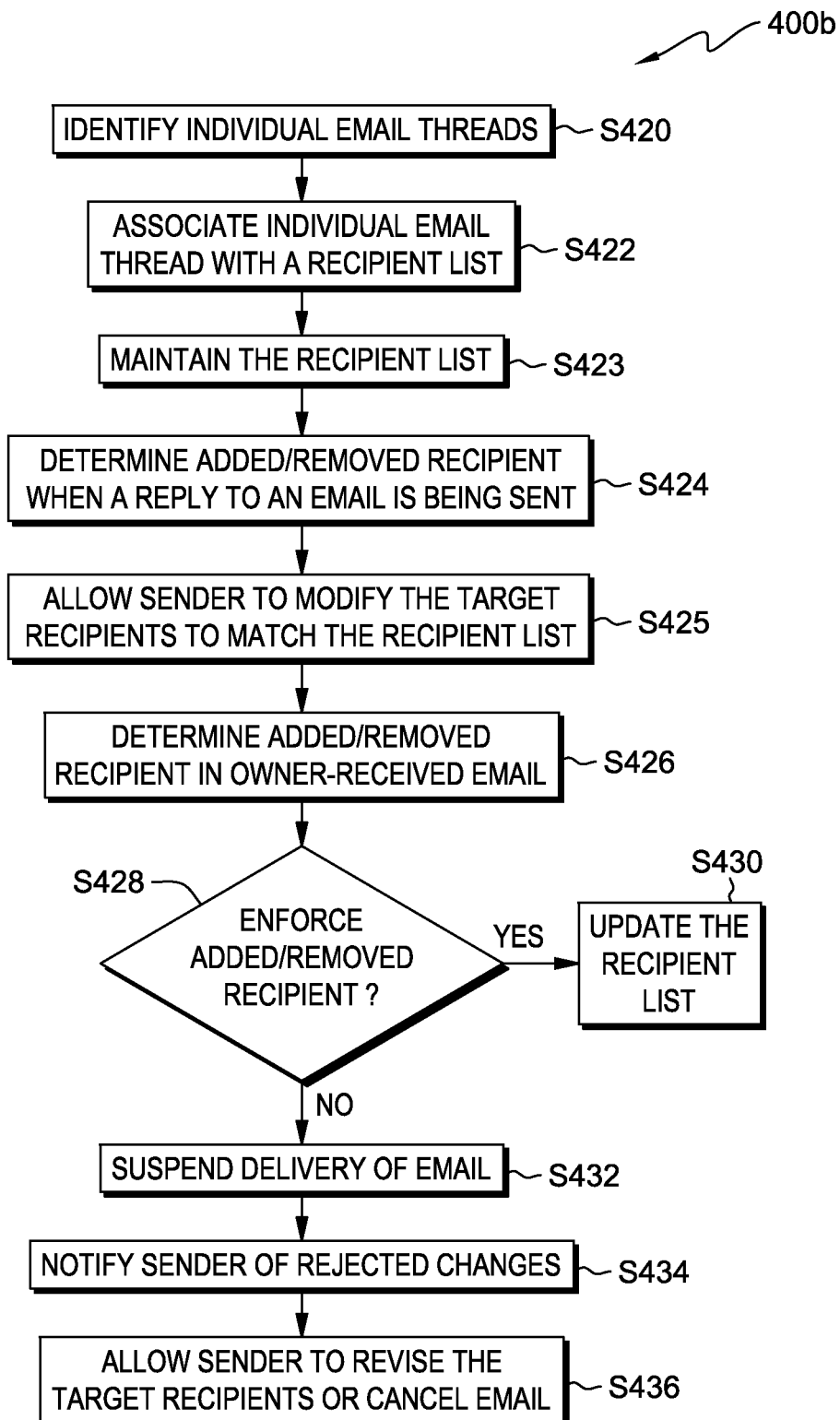
FIG. 4B is a flowchart showing a second method performed, at least in part, by the second embodiment system.
Figure 5:
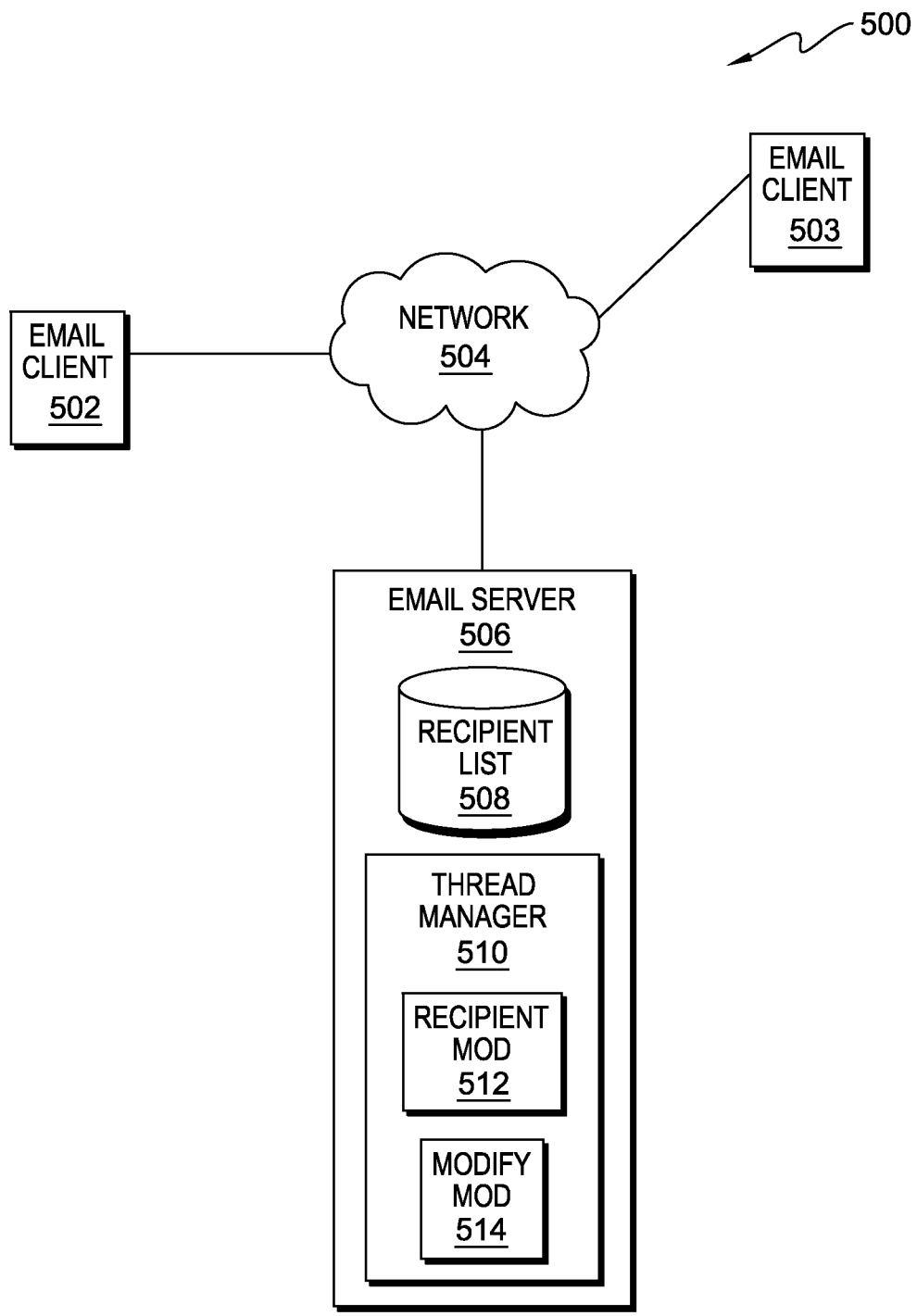
FIG. 5 is a schematic view of the second embodiment system according to the present invention.

The discussion that follows will address embodiments of the present invention for use in email communications. FIGS. 4A and 4B shows flowcharts 400*a* and 400*b* depicting methods according to an embodiment of the present invention. FIG. 5 shows thread manager 510 for performing at least some of the method steps of flowcharts 400*a* and 400*b*. This method and associated software will now be discussed, over the course of the following paragraphs, with reference to FIGS. 4A and 4B (for the method step blocks) and FIG. 5 (for the software blocks).

Some embodiments of the present invention associate a master recipients list to each email thread in an exchange of related electronic communications over network 504. Recipient list 508 may be maintained at, for example: (i) email client 502, 503; or (ii) email server 506. For some embodiments of the present invention, maintaining the recipient list includes one, or more, of the following: (i) notifying email senders of any differences between their target recipient list and recipient list 508; (ii) providing options to modify a sender's target recipient list before sending any reply to the email thread; (iii) determining options to send missing emails to newly added users; and/or (iv) reporting options to send missing emails to newly added users.

Essentially, for some embodiments of the present invention, when a user sends a reply to an email thread and has selected as a basis email, an old email in the thread that does not include recipients added at a later date, email client 502 gives the user an option to include those added recipients. Further, for some embodiments of the present invention, when a user sends a reply to an email thread by selecting an earlier received email in the thread as the basis email and adds a new recipient, the email client notifies the user that there are other emails received on the thread after the date of the basis email. Also, the email client may give the user an option to send those other emails to the newly added recipient.

Two enforcement scenarios are discussed below. First, loose enforcement scenario 400a, then strict enforcement scenario 400b will be discussed. In the loose enforcement scenario 400a (FIG. 4A), conventional techniques are employed to identify individual, or unique, email threads (step S402). Thread manager 510 associates each individual email thread with a set of recipients, recipient list 508 (step S404). The recipient list for each email thread may be readily maintained at either email server 506 or email client 502, 503. In this scenario, thread manager 510 maintains the recipient list at the email client side (S406).

When a reply is received for an identified thread, recipient module 512 determines whether any recipient is added or removed from that email communication (S408). The recipient module updates the corresponding recipient list according to the recipients of the sent email (S410). When an email sender replies to the email thread, recipient module 502 determines whether the target recipients entered into the reply reflects an addition and/or removal of any recipients with respect to the recipient list (S412). In this embodiment, the recipient module compares the specified target recipients to recipient list 508 associated with the corresponding email thread as the email is sent. Alternatively, the sender prompts the recipient module to check target recipients for compliance with the recipient list. Alternatively, the recipient module checks for a match to the recipient list as the target recipients are entered into the reply, whether entered as a group (reply to all) or entered individually. Modify module 514 notifies the sender of any added and/or removed recipient(s) (S414). The modify module allows the sender to modify the target recipients list (for the outgoing email) by providing an option to add and/or remove target recipients. In some embodiments of the present invention, modify module 514 allows the sender to modify recipient list 508 associated locally with the email thread on the email client 502,503.

In the strict enforcement scenario 400b (FIG. 4B), conventional techniques are employed to identify individual, or unique, email threads (step S420). Thread manager 510 associates each individual email thread with a set of recipients, recipient list 508 (step S422). In this embodiment, recipient module 512 maintains recipient list 508 at email server 506 (step S423). The scenario discussed herein is referred to as a strict enforcement scenario because the recipient list is maintained on the email server side instead of the individual ones on email clients 502, 504.

As a sender prepares to send a reply in an email thread, recipient module 512 determines whether any recipient is added and/or removed from that email communication according to the recipient list 508 (step S424). In this embodiment, the recipient module compares the specified target recipients to recipient list 508 associated with the corresponding email thread as the email is sent. Alternatively, the sender prompts the recipient module to check target recipients for compliance with the recipient list. Alternatively, the recipient module checks for a match to the recipient list as the target recipients are entered into the reply, whether entered as a group (reply to all) or entered individually. When an added and/or removed recipient is determined, modify module 514 provides the sender with the option to modify the target recipients to match the recipient list (step S425). Regardless of the action taken by the sender, when the reply is received by the owner of the email thread recipient module 512 determines whether any recipient is added and/or removed from the owner-received email communication (S426). When a difference is identified between the target recipients and recipient list 508, modify module 514 provides the owner with an option to enforce the sender's decision to add and/or remove a recipient with respect to the recipient list (decision step S428). If the changes are enforced by the owner, processing proceeds to step S430, where modify module 514 updates the recipient list accordingly. If the owner rejects the changes made to the target recipient(s), recipient module 512 suspends delivery of the email (step S432). The recipient module notifies the sender of rejected changes, specifically the additions and/or deletions made to the target recipient list with respect to the recipient list at the email server side (step S434). The recipient module then provides the sender with an option to revise the target recipients in the outgoing email to match the recipient list at the email server side or to cancel the email message (step S436).

Some embodiments of the present invention may include one, or more, of the following features, characteristics and/or advantages: (i) handles recipient updates for an electronic communications thread; (ii) provides two mechanisms of enforcements—strict and loose; (iii) provides an electronic communications client that maintains a list of recipients of a thread; (iv) provides an electronic communications client that updates the list when a reply is received; (v) provides an electronic communications client that notifies the user while replying to the electronic communications thread, if a master recipient list is different than that associated with the thread; (vi) stores a master recipient list on a server; (vii) updates a master recipient list when a reply is received; (viii) sends a notification back to a sender if the target recipient list does not match the master recipients list associated with the electronic communications thread; (ix) provides a user with the option to modify the target recipient list of an electronic communication when there is difference with the client and/or server maintained master recipient list; and/or (x) identifies any electronic communications received later than the receipt date of the basis electronic communication; (xi) notifies the sender of any electronic communications received later than the receipt date of the basis electronic communication where a new recipient (with respect to the master recipient list) is added; (xii) sends to a new recipient any electronic communications received later than the receipt date of the basis electronic communication where the new recipient was added upon selecting the option provided; (xiii) provides a technique for handling multiple, parallel updates to electronic communications threads; (xiv) does more than scan and monitor email messages subsequent to a recipient receiving one to determine whether or not there are any new related emails that should be sent to the recipient; (xv) addresses the problem of adding and dropping recipients to the email threads done with some purposes; (xvi) addresses the problem of not using an up-to date list of recipients when replying to electronic communications threads, which happens when someone picks up an old email in the thread to reply to the thread; (xvii) maintains a master recipient list with each email thread; and/or (xviii) provides an option to send previous electronic communications in the thread to any new recipients who would not have received them.

Some helpful definitions follow:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as may be being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Computer: any device with significant data processing and/or machine readable instruction reading capabilities including, but not limited to: desktop computers, mainframe computers, laptop computers, field-programmable gate array (fpga) based devices, smart phones, personal digital assistants (PDAs), body-mounted or inserted computers, embedded device style computers, application-specific integrated circuit (ASIC) based devices.

What is claimed is:

1. A computer program product comprising a computer readable storage medium having stored thereon:
   program instructions programmed to record to a database a first master participant list associated with a first message thread, the first master participant list including a sender and each recipient of a first message of the first message thread;
   program instructions programmed to identify a plurality of message threads including the first message thread, wherein each message thread is a set of messages, each message thread having a corresponding master participant list recorded to the database;
   program instructions programmed to establish a message directed to a target participant list, the message associated with the first message thread;
   program instructions programmed to identify in the database the first master participant list associated with the first message thread of the message;
   program instructions programmed to compare target participants of the target participant list in the message with thread participants of the first master participant list;
   program instructions programmed to, responsive to a target participant of the target participants not being included as a thread participant of the thread participants in the first master participant list, add the target participant to the first master participant list;
   program instructions programmed to collect a set of missed messages in the first message thread not received by the target participant, including one or more missed messages occurring in parallel with the target participant being added to the first master participant list; and
   program instruction programmed to send the set of missed messages to the target participant as a message directed only to the target participant.

2. The computer program product of claim 1 wherein the computer readable storage medium has further stored thereon:
   program instructions programmed to identify a start message where the target participant is first added to messages of the first message thread;
   wherein:
   collecting the set of missed messages includes:
      determining a set of previous messages in the first message thread generated before the start message; and
      adding the set of previous messages to the set of missed messages.

3. The computer program product of claim 2 wherein the set of missed messages includes a set of parallel messages occurring after the identification of the start message and not received by the target participant.

4. The computer program product of claim 2 wherein the computer readable storage medium has further stored thereon:
   program instructions programmed to suggest the set of missed messages be read by the target participant.

5. The computer program product of claim 1, wherein establishing the message includes:
   identifying the message received by a user; and
   determining the message is associated with the first message thread.

6. The computer program product of claim 1, wherein establishing the message includes:
   identifying a reply message from a user as the message; and
   determining the message is associated with the first message thread.

7. A computer system comprising:
   a processor(s) set; and
   a computer readable storage medium;
   wherein:
   the processor set is structured, located, connected and/or programmed to run program instructions stored on the computer readable storage medium; and
   the program instructions include:
      program instructions programmed to record to a database a first master participant list associated with a first message thread, the first master participant list including a sender and each recipient of a first message of the first message thread;

program instructions programmed to identify a plurality of message threads including the first message thread, wherein each message thread is a set of messages, each message thread having a corresponding master participant list recorded to the database;

program instructions programmed to establish a message directed to a target participant list, the message associated with the first message thread;

program instructions programmed to identify in the database the first master participant list associated with the first message thread of the message;

program instructions programmed to compare target participants of the target participant list in the message with thread participants of the first master participant list;

program instructions programmed to, responsive to a target participant of the target participants not being included as a thread participant of the thread participants in the first master participant list, add the target participant to the first master participant list;

program instructions programmed to collect a set of missed messages in the first message thread not received by the target participant, including one or more missed messages occurring in parallel with the target participant being added to the first master participant list; and program instruction programmed to send the set of missed messages to the target participant as a message directed only to the target participant.

8. The computer system of claim 7 wherein the program instructions further include: program instructions programmed to identify a start message where the target participant is first added to messages of the first message thread; wherein: collecting the set of missed messages includes: determining a set of previous messages in the first message thread generated before the start message; and adding the set of previous messages to the set of missed messages.

9. The computer system 8 wherein the set of missed messages includes a set of messages occurring after the identification of the start message and not received by the target participant.

10. The computer system of claim 8 wherein the program instructions further include:

program instructions programmed to suggest the set of missed messages be read by the target participant.

11. The computer system of claim 7, wherein establishing the message includes:

identifying the message received by a user; and determining the message is associated with the first message thread.

12. The computer system of claim 7, wherein establishing the message includes:

identifying a reply message from a user as the message; and determining the message is associated with the first message thread.

* * * * *